(12) United States Patent
Yu et al.

(10) Patent No.: US 6,779,181 B1
(45) Date of Patent: Aug. 17, 2004

(54) MICRO-SCHEDULING METHOD AND OPERATING SYSTEM KERNEL

(75) Inventors: Hang-jae Yu, Suwon (KR); Hyun-sik Kim, Anyang (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/536,044

(22) Filed: Mar. 27, 2000

(30) Foreign Application Priority Data

Jul. 10, 1999 (KR) .......................................... 1999-27887

(51) Int. Cl.[7] .............................................. G06F 9/00
(52) U.S. Cl. ...................... 718/102; 718/103; 719/322
(58) Field of Search .......................... 702/119–123; 709/100, 102–104, 107, 108; 717/127, 131

(56) References Cited

U.S. PATENT DOCUMENTS

| | | | | |
|---|---|---|---|---|
| 5,543,822 A | * | 8/1996 | Spilo et al. ................. | 345/189 |
| 5,640,563 A | * | 6/1997 | Carmon ...................... | 709/102 |
| 5,644,715 A | | 7/1997 | Baugher | |
| 5,944,778 A | * | 8/1999 | Takeuchi et al. ............ | 709/100 |
| 6,041,354 A | | 3/2000 | Biliris et al. | |
| 6,092,095 A | * | 7/2000 | Maytal ....................... | 709/100 |
| 6,279,039 B1 | * | 8/2001 | Bhat et al. .................. | 709/226 |
| 6,301,604 B1 | | 10/2001 | Nojima | |
| 6,470,406 B1 | * | 10/2002 | Dillenberger et al. ....... | 710/200 |
| 6,654,780 B1 | | 11/2003 | Eilert et al. | |

FOREIGN PATENT DOCUMENTS

| | | |
|---|---|---|
| EP | 0 554 615 A2 | 8/1993 |
| EP | 0 762 275 A2 | 3/1997 |
| EP | 0 923 248 A2 | 6/1999 |
| JP | 05-265974 A | 10/1993 |
| JP | 05-303538 A | 11/1993 |
| JP | 09-152977 A | 6/1997 |
| JP | 10-289116 A | 10/1998 |
| JP | 11-161505 A | 6/1999 |

OTHER PUBLICATIONS

J.C. Brustoloni and P. Steenkiste, "Evaluation of Data Passign and Scheduling Avoidance," IEEE Xplore, May 1997, pp. 95–105, St. Louis, MO USA.

K. Fall and J. Pasquale, "Improving Continuous–Media Playback Performance with In–Kernel Data Path, " IEEE Xplore, May 1994, pp. 100–109, Boston, MA USA.

Jiandong Huang and Ding–Zhu Du, "Resource Management for Continuous Multimedia Database Applications, " IEEE Xplore, Dec. 1994, pp. 46–54, San Juan Puerto Rico.

* cited by examiner

Primary Examiner—Meng-Al T. An
Assistant Examiner—George Lawrence
(74) Attorney, Agent, or Firm—Sughrue Mion, PLLC

(57) ABSTRACT

A scheduling method implemented in an operating system kernel for supporting multimedia applications is provided. The micro-scheduling method includes the steps of determining a performance parameter by measuring I/O-bound job performance and CPU-bound job performance in a given application, and appropriately adjusting the performance parameter according to a policy set by a system administrator when carrying out job admission control. Determining an order of priority for processing application classes based on the performance measuring and job admission control by scheduling the periodical execution of I/O jobs of data which need not be moved to a user space due to the characteristics of multimedia applications, and executing a special I/O system call according to the order of priority for processing is also provided. The micro-scheduling method enables the support of accurate QoS for any operating system which supports multimedia applications.

20 Claims, 4 Drawing Sheets

MICRO-SCHEDULING METHOD AND OPERATING SYSTEM KERNEL

BACKGROUND OF THE INVENTION

1. Field of the Invention

The present invention relates to a micro-scheduling method, and more particularly, to a micro-scheduling method for implementation on an operating system that supports multimedia applications. The present application is based upon Korean Application No. 99-27887, which is incorporated herein by reference.

In addition, the present invention relates to an operating system kernel for implementing the above micro-scheduling method.

2. Description of the Related Art

Operating systems such as UNIX(™), LINUX (™), and Windows NT (™) use a task scheduling method, which has a time window of about 10 milliseconds, for supporting multiple users. In order to support multimedia applications, functions that satisfy Quality of Service (QoS) requirements must be supported in an operating system and a network. However, if a plurality of applications are processed, continuous interruptions occur according to a set task scheduling, even during the processing of multimedia data, thereby interrupting the processing of multimedia or causing it to be discontinuous. That is, scheduling methods used in conventional operating systems have a drawback in that they cannot satisfy the QoS requirements for supporting multimedia applications.

Another conventional technology to solve the above problem uses a method of modifying a process structure, for example, making a shared heap. This method has a drawback in that such modification causes loss of compatibility with existing software.

If a real-time scheduling algorithm is applied according to a third conventional technology to solve the above problem, it can cause a substantial drop in performance due to admission control, maintaining backward compatibility, and severe reduction of the QoS. It can also cause a problem in which a previously guaranteed service quality cannot be achieved in an overload state.

SUMMARY OF THE INVENTION

In order to solve the above problems, an objective of the present invention is to provide a micro-scheduling method to satisfy the QoS requirements for supporting multimedia applications.

Another objective of the present invention is to provide an operating system kernel to implement the above micro-scheduling method.

Accordingly, to achieve the above objective of the invention, there is provided a micro-scheduling method for implementation on an operating system kernel for supporting multimedia applications. The micro-scheduling method includes the steps of determining performance parameters of a plurality of applications by measuring an I/O-bound job performance and a CPU-bound job performance in the applications. Second, the performance parameters according to a policy set by a system administrator when carrying out job admission control are adjusted appropriately. Third, the processing priority of each of a plurality of application classes, by scheduling a periodical execution of I/O jobs of data that do not require to be moved to a user space due to characteristics of multimedia application data is determined. Finally, a special I/O system call according to an order of priority decided in the previous step is executed.

In order to achieve another objective of the invention, there is provided an operating system kernel for supporting multimedia applications. The operating system kernel includes an enterprise QoS (E-QoS) resource managing means for determining performance parameters by measuring I/O-bound job performance and CPU-bound job performance in a given application, and carrying out job admission control to adjust the performance parameter appropriately according to a policy set by a system administrator. A special I/O scheduling means for scheduling the periodical execution of I/O jobs of data which does not need to be moved to a user space due to the characteristics of multimedia applications; and a special I/O service routine means for carrying out a special I/O system call according to the order of priority set by the special I/O scheduling means is provided.

BRIEF DESCRIPTION OF THE DRAWINGS

The above objectives and advantages of the present invention will become more apparent by describing in detail a preferred embodiment thereof with reference to the attached drawings in which.

DETAILED DESCRIPTION OF THE PREFERRED EMBODIMENT

Figure 1:
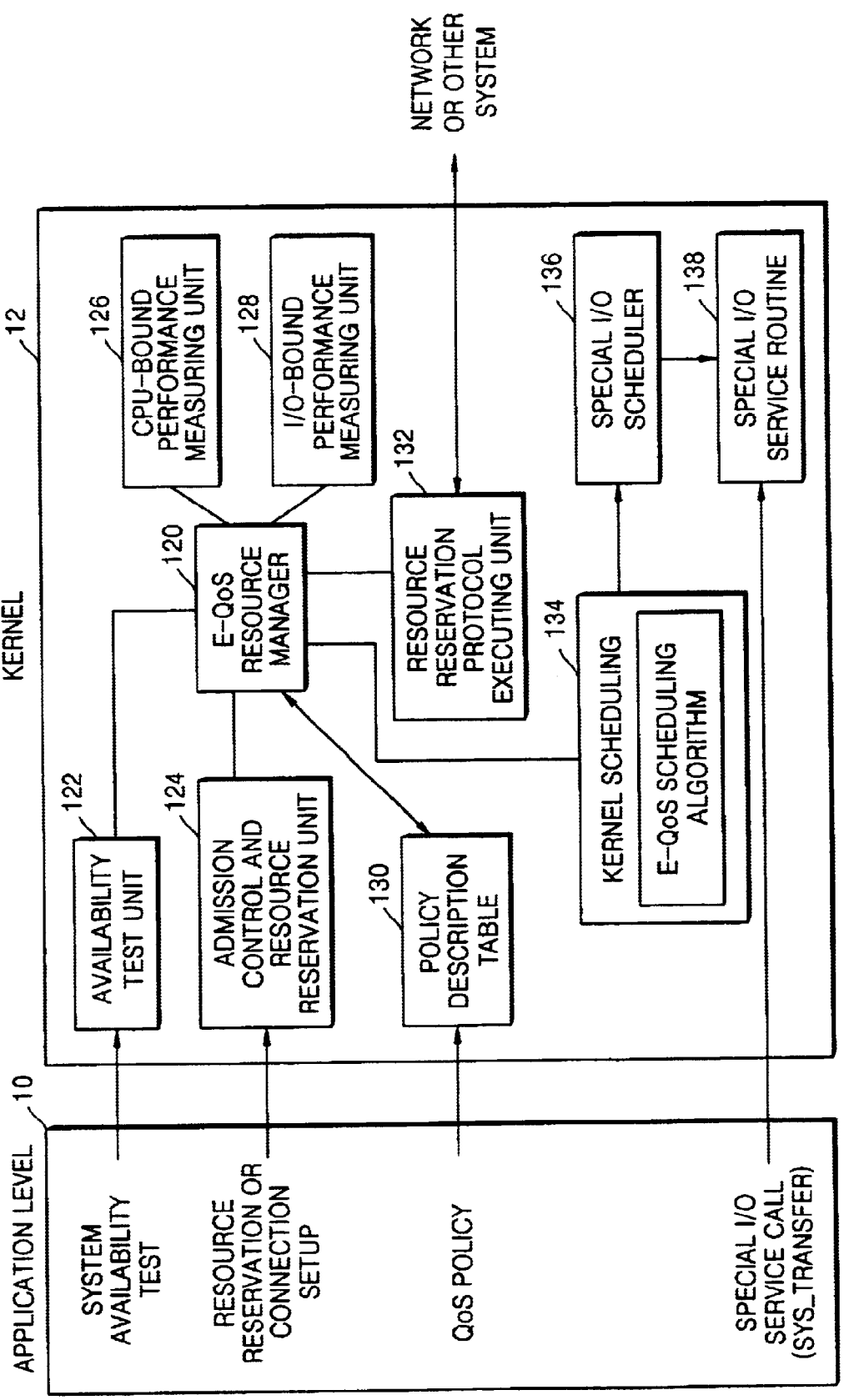
FIG. 1 is a block diagram showing the structure of an operating system kernel in which a micro-scheduling method according to the present invention is implemented.

FIG. 1 is a block diagram showing the structure of an operating system kernel in which a micro-scheduling method according to the present invention is implemented. Referring to FIG. 1, the operating system kernel 12 includes an enterprise QoS (E-QoS) resource manager 120, an availability test unit 122, an admission control and resource reservation unit 124, a CPU-bound performance measuring unit 126, and an I/O-bound performance measuring unit 128. In addition, the operating system kernel 12 includes a policy description table 130, a resource reservation protocol executing unit 132, a kernel scheduler 134, a special I/O scheduler 136, and a special I/O service routine 138.

The E-QoS resource manager 120 measures the performances of I/O-bound and CPU-bound jobs in order to allocate resources according to resource reservations and policy, and carries out job admission control to appropriately adjust performance parameters according to the policy set by a user.

Further, as shown in FIG. 1, the E-QoS resource manager 120 manages resources and is linked to the neighboring units, such as the availability test unit 122 which executes an availability test, the admission control and resource reservation unit 124 which executes admission control and resource reservation, the CPU-bound performance measuring unit 126 which measures CPU-bound performance, and the I/O-bound performance measuring unit 128 which measures I/O-bound performance. The resource management of the E-QoS resource manager 120 can be divided according to a link to each of the functional units. The policy description table 130 stores a default scope and a maximum use limit of system resources by each application. That is, the E-QoS resource manager 120 carries out resource management by using E-QoS modeling based on performance parameters predicted in an application 10, the order of priority according to a class of the application 10, and resource allocation in the policy description table set by a user.

The special I/O scheduler 136 carries out scheduling a periodical execution of I/O jobs of multimedia application data that does not need to be moved to user space due to the characteristics of multimedia applications. The special I/O service routine 138 carries out a special I/O system call according to an order of priority set by the special I/O scheduler 136. The system call, which carries out special I/O services, is responsible for I/O operations that do not need data movement to a user space due to the characteristics of multimedia applications. An example of such an I/O operation can be found in an application that forwards an MPEG stream encoded in a DVD player to a network. In this case, the application carries out the beginning and ending of the forwarding, while it only performs monitoring during the rest of the forwarding.

In general, I/O jobs are divided into four categories:

1) I/O service class 1: The class moves data from a user space to a system. For example, storing user data in a disk or forwarding the user data to a network after reading the user data of a memory is included in this class.

2) I/O service class 2: The class moves data from a user space to another user space. For example, forwarding data to a local host according to a Transmission Control Protocol (TCP)/Internet Protocol (IP), or communicating data using an I/O mechanism between multimedia applications like a lip sync application is included in this class.

3) I/O service class 3: The class moves data from a system to a user. For example, writing data received from a network or read from a disk into a data area of an application is included in this class.

4) I/O service class 4: The class moves data from a system to another system. For example, forwarding via a network data stored in storage medium such as a CD-ROM, or the accessing of data in a network file system by a remote system is included in this class.

Here, the I/O service class 4 is a special I/O that can occur in multimedia applications. The special I/O(SIO) is divided into three classes:

1) SIO class 1: This carries out I/O operations from a disk file to a network and vice versa. For example, VOD, web download, and FTP are included in this class.

2) SIO class 2: This carries out I/O operations from an I/O to a network and vice versa. For example, Voice over Internet Protocol (VOIP) and video conference are included in this class.

3) SIO class 3: This carries out I/O operations to/from applications, between threads, or in a loop-back method. For example, a lip sync application is included in this class.

Figure 2:
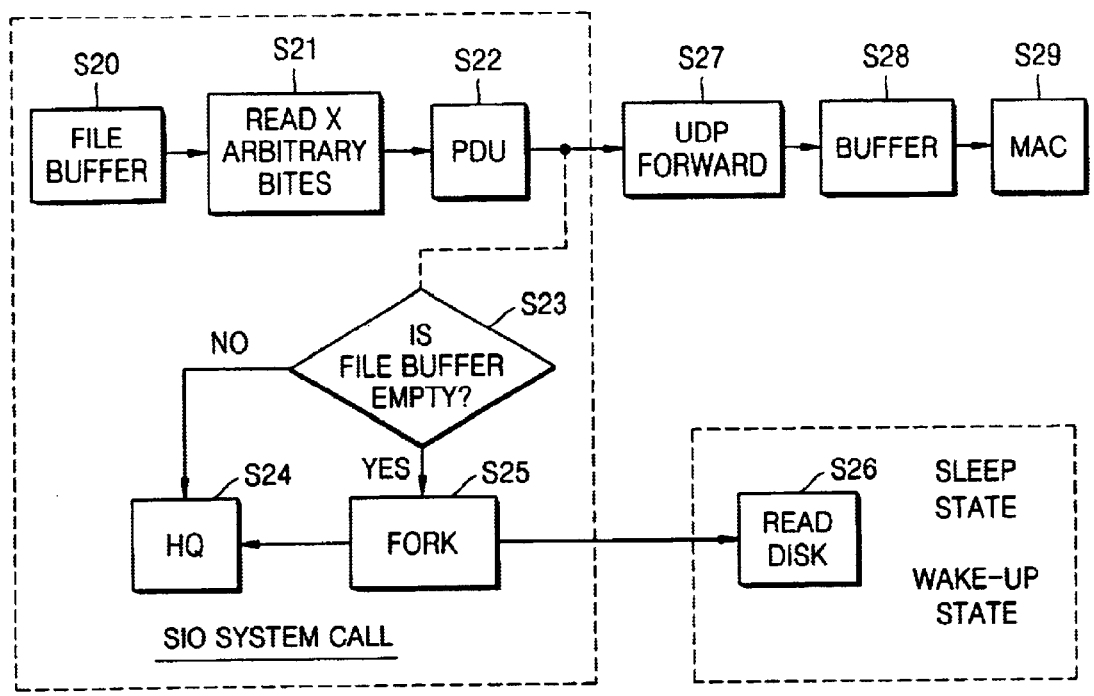
FIGS. 2 through 4 illustrate special I/O classes 1, 2, and 3, respectively.

FIG. 2 illustrates an example of the SIO class 1 structure. As illustrated in FIG. 2, in step S20, the SIO class 1 allocates a file buffer. In step S21, the SIO class 1 reads X arbitrary bytes from the file buffer. If the file buffer is empty when checked in step S23, a protocol data unit (PDU) executes a fork in step S25. The PDU wakes up a disk device and reads data from the device in step S26, and stores the result in a high queue (HQ) in step S24. If the file buffer is not empty when checked in step S23, the PDU forwards data stored in the HQ in step S24, and maintains the disk in a sleep state. In step S27, the PDU forwards the data to a network system via a user data protocol (UDP), and in step S28, the data forwarded to the network system is stored in a buffer of the network system. The UDP data stored in the buffer of the network system is forwarded to the network system using medium access control in step S29. Here, the special I/O (SIO) system call manages the steps from the file buffer allocation to wake-up/sleep state maintaining and disk reading, as the portion indicated by the dotted line of FIG. 2.

Figure 3:
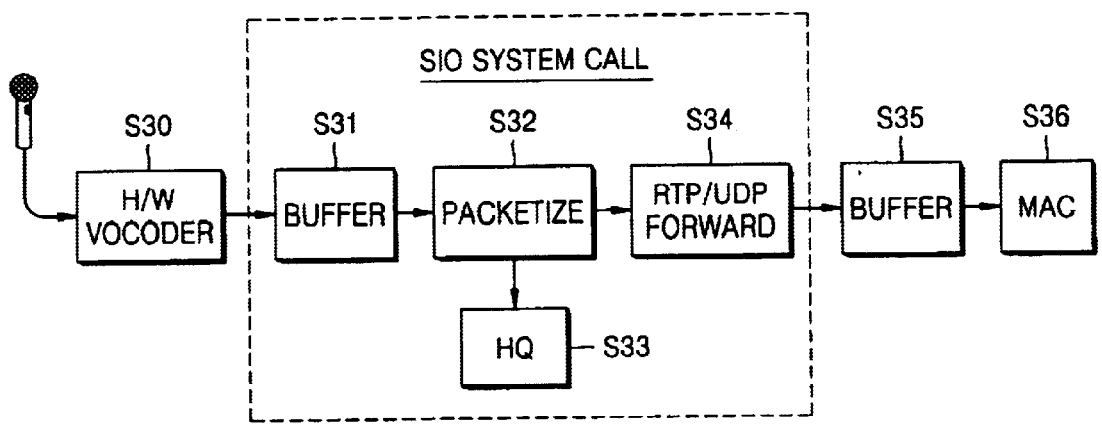

FIG. 3 illustrates an example of the SIO class 2 structure. Referring to FIG. 3, external voice is input into a microphone and transformed into an electrical signal. The transformed voice signal is input to a hardware vocoder, and then is converted into digital voice data in step S30. The digital voice data are stored in a buffer in step S31, and is packetized in step S32. The packetized data are stored in an HQ in step S33. Then the packetized data are forwarded to a network system via Real-time Transport Protocol (RTP)/UDP in step S34. The data forwarded via RTP/UDP are stored in a buffer of the network system in step S35. The data stored in the buffer of the network system are forwarded to the network system using medium access control in step S36. Here, the special I/O (SIO) system call manages the steps from storing into the buffer to forwarding RTP/UDP, as the portion indicated by the dotted line of FIG. 3.

Figure 4:
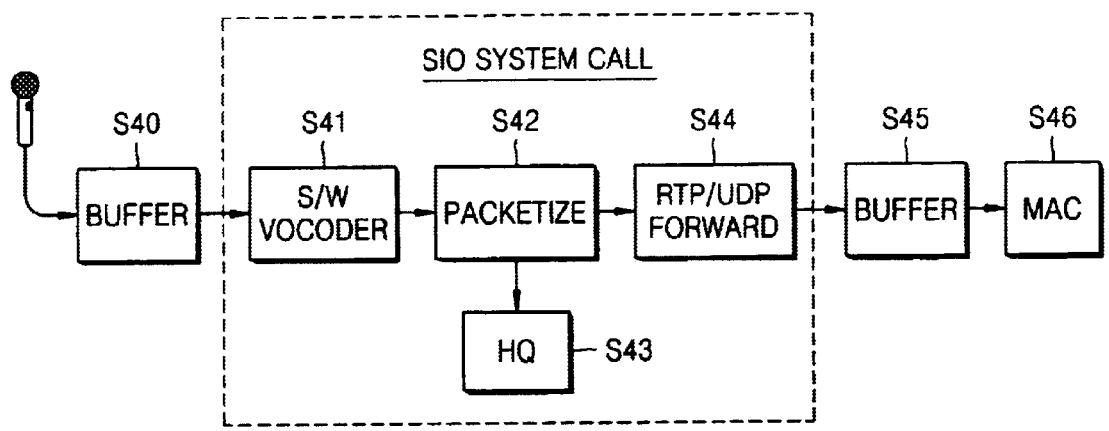

FIG. 4 illustrates an example of the SIO class 3 structure. As illustrated in FIG. 4, external voice is input into a microphone and transformed into an electrical signal. The transformed voice signal is converted into digital voice data, and then stored into a buffer in step S40. The voice data stored in the buffer are input into a software vocoder in step S41. In step S42, the software vocoder packetizes the voice data, and in step S43 stores the packets into an HQ. The rest of the operations of the SIO class 3 are the same as explained in FIG. 3.

Meanwhile, the E-QoS resource manager 120 measures the performance of a certain type job and job admission control by a policy set by a user. For performance measuring, 12.5 microseconds is regarded as one performance unit (PU). That is, the execution time of an application is calculated by determining how many PUs are needed in the application.

In most Pentium (™)-level systems, most system calls, with the exception of 'fork' or 'exec', are executed within microseconds to tens of microseconds, and a basic frame unit in a telecommunications network is 12.5 microseconds. Therefore, it is desirable to define a PU as 12.5 microseconds. If a PU is defined as 12.5 microseconds, then it has the advantage that the PU can be easily applied to performance measuring and benchmarking of multimedia applications hereafter. 640 milliseconds of available performance is equal to 51,200 PUs.

However, the definition of a PU is not limited to 12.5 microseconds, and can be changed according to system performance.

In a system or a network, for example, 30 to 60 frames must be forwarded every second in order to process an MPEG stream, and a voice packet must be forwarded every 30 milliseconds in order to carry out a voice call in compliance with the G.723 Standard. In this case, the system performance is more closely related to factors influencing memory copy performance, such as the bandwidth of a system bus, communication protocol, and the size of an I/O buffer, rather than the MIPS value of a CPU.

The time interval in a typical multimedia system is the most important attribute in QoS parameters, and therefore, the time interval is used for system performance in the present embodiment instead of the MIPS unit. Further, efficient processing of multimedia data is enabled by using the time interval. However, the MIPS value of a CPU is an important measure in, for example, CPU-bound jobs as, MPEG decoding. That is, a measure for performance measuring can be changed according to an application class. Therefore, in order to determine the performance of each application, first, basic values are measured using a test program according to the class of an application, and second measured basic values are compensated for in a real operating environment.

For mission-critical jobs, the number of transactions that can be processed is measured by using a benchmark program appropriate for the characteristics of an application program such as 'debit-credit.' The minimum and maximum number of transactions to process must be decided. If the system performance is not enough even for only the mission-critical job, then the user must be informed to use a system with better performance.

For multimedia applications which require a resource reservation and interactive applications to comply with G.723 and H.263 standards, the number of encoding or decoding operations per second is measured after a user describes QoS parameters such as a scheduling cycle, and information on important routines which are repeatedly used.

For other applications that do not require real-time processing, performance measuring is omitted to reduce overheads due to the performance measuring. However, such applications can obtain performance information of a system to respond, and it is desirable to inform a user of predicted response time.

Meanwhile, setting up a policy determines the defaults and the maximum use limits of system resources by the four types of applications. Next, QoS parameters are exchanged based on the defaults and maximum scopes before a new application is executed, and then admission control is executed. An example of setting a policy will now be explained.

A minimum value of CPU time for an application of each class to use in a system is decided. It is assumed that the number of PUs of a system (PU_sys) is 51,200. Of the 51,200 PUs, 20,000 PUs are to be allocated to I/O jobs and the rest are to be allocated to CPU-bound jobs of user processes. If 20%, 10%, 10%, and 10% are allocated to I/O job class 1, 2, 3, and 4, respectively, as a minimum resource, then the minimum resources for each application are allocated as follows:

PUc1_def (default PU for class 1 applications)=4,000 PU
PUc2_def (default PU for class 2 applications)=2,000 PU
PUc3_def (default PU for class 4 applications)=2,000 PU
PUc4_def (default PU for class 4 applications)=2,000 PU Next, the remaining resources are allocated according to usage patterns of applications. Because 10,000 PUs of the total 20,000 PUs have been allocated, the remaining 10,000 PUs are available for use. The remaining resources can be commonly used among the four application classes. If the maximum use value in the usage pattern of a class 1 application is increased and the predetermined set value of a class 3 application is not exceeded, additional resources can be allocated as follows:

PUc1_def (additional PU for class 1 applications)=4,000 PU
PUc2_def (additional PU for class 2 applications)=2,000 PU
PUc3_def (additional PU for class 4 applications)=2,000 PU
PUc4_def (additional PU for class 4 applications)=2,000 PU Therefore, the following scopes of the CPU resources are allocated to each application class:

PUc1=(PUc1_def, PUc1_max>=<4,000, 11,500> PU)
PUc2=(PUc2_def, PUc2_max>=<2,000, 4,500> PU)
PUc3=(PUc3_def, PUc3_max>=<2,000, 2,000> PU)
PUc4=(PUc4_def, PUc4_max>=<2,000, 9,500> PU)

The E-QoS modeling is based on the measured performance parameters of a given application, the priority according to an application class, and resource allocation in the policy administrator set by a user.

parameters of applications by class will now be described. Examples of the class 2 applications are voice communications and video conferencing. As for voice communications, processing one direction in a voice communication includes a two-step task. In the first step, an I/O device reads data through a voice codec. In the second step, the data are forwarded in a packetized form every 30 milliseconds through a telecommunications protocol. As for video conferencing, after inputting data through a vocoder and a video coder, respectively, voice data are forwarded every 30 milliseconds and image data are forwarded every 150 milliseconds.

Class 3 applications have the same characteristics as those of class 2 applications with the exception that a significant amount of system resources are used. In general, class 2 and class 3 applications need 10 millisecond-unit scheduling. If such jobs are included in large quantities, it is impossible to design an efficient system in the existing system due to context overhead.

In the E-QoS model according to the present invention, class 2 and class 3 applications are processed in the special I/O without passing through a user space. Thus, context switching in a user space is minimized. In addition, if the applications are processed in the special I/O, the prediction of job execution time, that is, a PU, becomes easier.

According to an embodiment of the present invention, the high queue (HQ) which has the highest priority in scheduling is used for class 2 and class 3 jobs. The HQ has a structure that can have time intervals, and a scheduler distributes jobs according to the time interval and job execution time.

Figure 5:
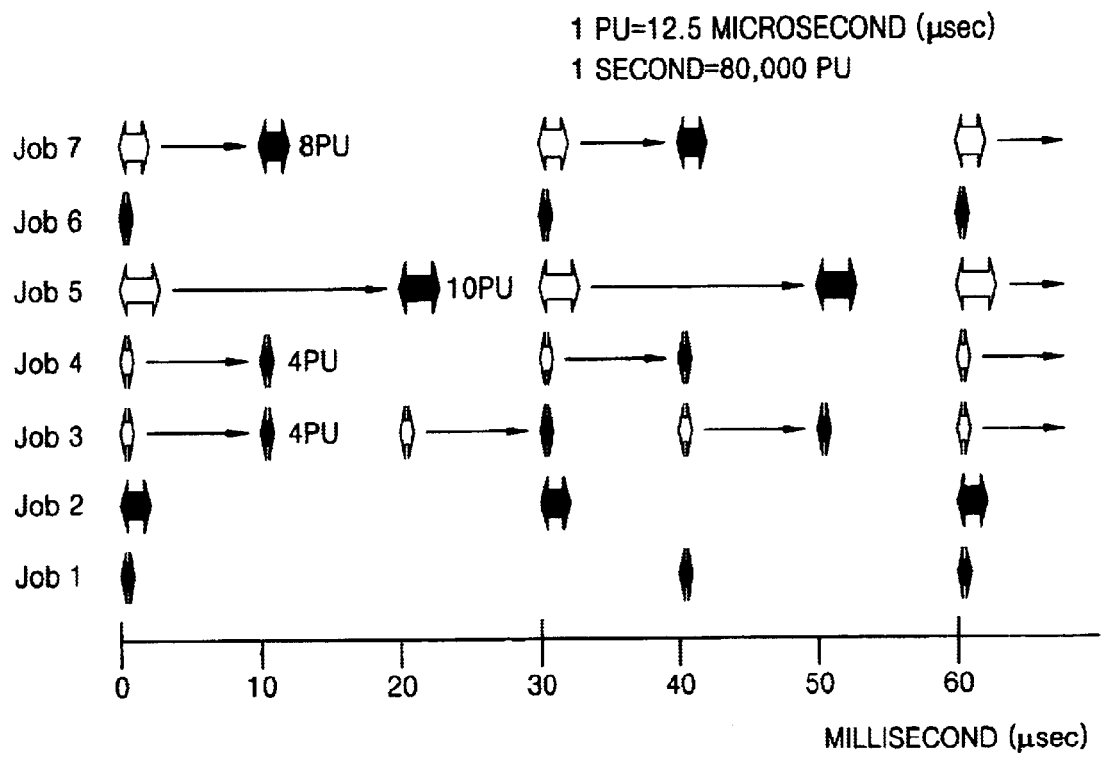
FIG. 5 illustrates an example of HQ job interval dispersion.

FIG. 5 illustrates an example of an HQ job interval dispersion. Referring to FIG. 5, 200 PUs are allocated to the I/O in 10 milliseconds. The PU scopes of <20, 45> and <20, 20> are allocated to class 2 and class 3 applications, respectively. In addition, 60 PUs which is the sum of the PU defaults of class 1 and class 4 applications are reserved. Here, if the sum of the maximum PU values of class 2 and class 3 and the default PU values of class 1 and class 4 exceeds 200, the QoS of some jobs of class 2 and class 3 cannot be guaranteed. Therefore, according to an embodiment of the present invention, if the sum of the maximum PU values of class 2 and class 3 and the default PU values of class 1 and class 4 exceeds 200, appropriate adjustments are made in admission control.

According to an embodiment of the present invention, an HQ is made up with the greatest common divisor (hereinafter referred as 'GCD') of time cycles required in job scheduling as a building unit. It is desirable to have a cycle of less than 10 milliseconds as a 10 millisecond cycle. In addition, jobs in a certain queue are sequentially processed every GCD cycle until the queue is empty.

Figure 6:
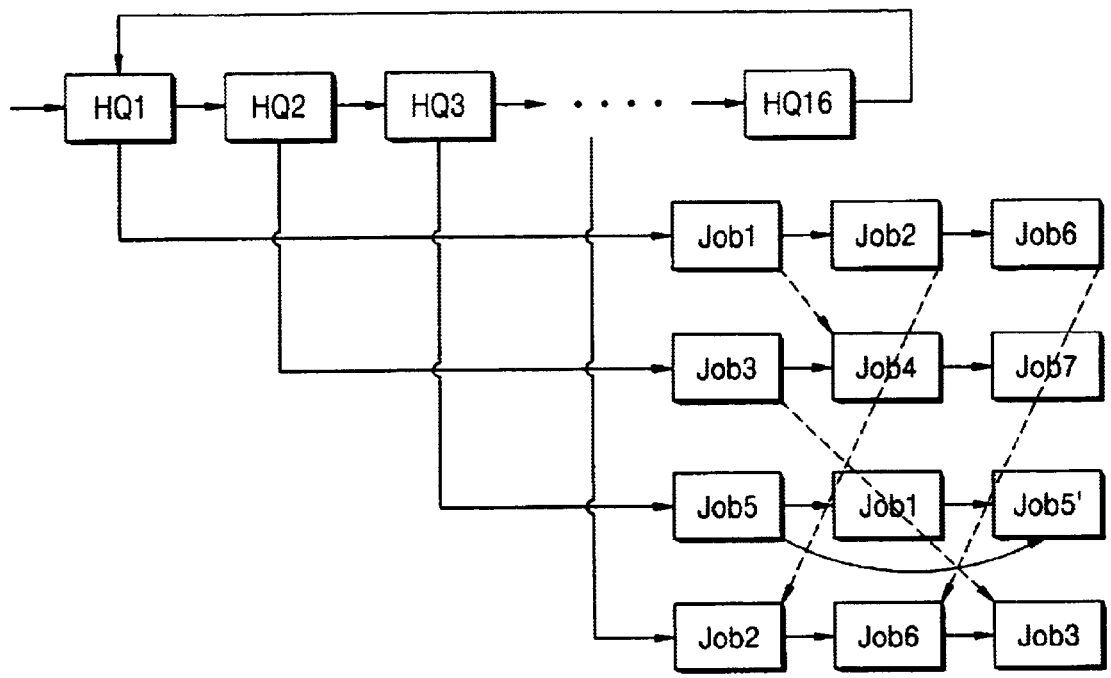
FIG. 6 is a block diagram showing an example of an HQ configuration.

FIG. 6 is a block diagram showing an example of an HQ configuration. Referring to FIG. 6, seven class 2 and class 3 jobs are distributed in the HQ. Since the transaction of the class 1 application does not need hardware in real time, it is possible to properly distribute certain PUs for jobs. A round robin (RR) technique is used for the scheduling of the class 1. The class 4 application has the lowest priority, and the RR technique is used for scheduling the same as the class 1.

After jobs are stored in the HQ, the class 1 jobs stored in a medium queue (MQ) are executed, and then the class 4 jobs stored in a low queue (LQ) are executed. Although the class 1 application has a separate queue, which is the MQ, the class 1 application can be guaranteed a higher priority in certain resources because the HQ always keeps reserves for the MQ's defaults.

There are two ways to move data from an I/O device to a network. One is moving data from an I/O buffer to a network buffer, and the other is reading data stored in a disk and forwarding the data to a network. The SIO class 2 explained above corresponds to the former case where data are forwarded from an I/O buffer to a network buffer, e.g., VoIP and video conferencing. In the VoIP application, TCP is initially used for setting a call, and packets which are input through a microphone/vocoder device are forwarded to a network through a TCP/UDP. At this time, about 30 bytes of real data must be forwarded every 30 milliseconds. The application is set to a sleep state, and only the monitoring event of an RTP session is processed if it occurs. Therefore, reading data from a kernel space into a user space, vice versa is unnecessary, and a VoIP user process for carrying the reading is unnecessary to schedule. This method according to the present invention enables periodical scheduling and dramatically reduces a system overhead.

The case where file data such as an MPEG stream are read and forwarded to a network can be found in applications such as VOD or HTML documents. In these applications, a file is opened and the file data are read in a buffer of a user space.

Figure 7:
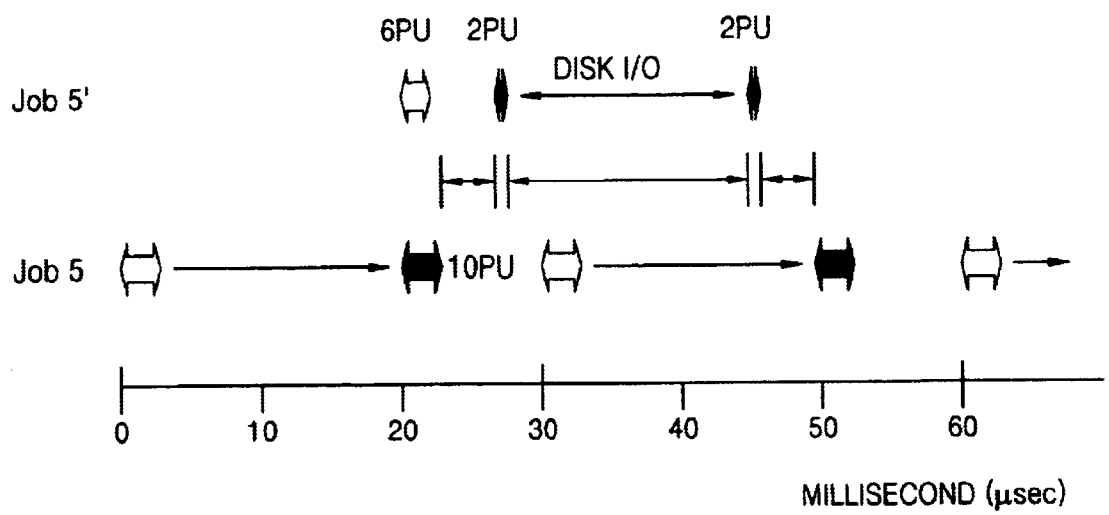
FIG. 7 illustrates a special I/O job accompanying disk I/Os.

FIG. 7 illustrates an example of a special I/O job accompanying disk I/Os. In FIG. 7, a method of processing a special I/O system call accompanying a disk read in a kernel is illustrated. If an MPEG stream must be forwarded at 30 frames/second with 500 Kbytes/frame, then the special I/O routine is processed according to three events. First, if data are contained in a file buffer, then the data are directly packetized and forwarded as UDP data. However, if there are no data to forward in the file buffer, then a routine for reading data from a disk is immediately called. Since a disk I/O needs about 20 milliseconds, if a disk interrupt occurs, then data are written into the file buffer in response to the interrupt.

The operating system according to the present invention divides multimedia applications such as interactive multimedia or MPEG video play and mission-critical applications into classes, and allocates and adjusts system and network resources by class, which enables the efficient support of multimedia QoS even in the Intranet and Internet that are not dedicated service networks.

The micro-scheduling method according to the present invention, as described above, can be applied to the operating system of any computers in which an operating system for processing multimedia data is present, servers such as web servers and multimedia servers, network equipment such as a router, and computer switching equipment.

Particularly, the above micro-scheduling method according to the present invention can be coded into a computer program. The program can be implemented in an operating system kernel when included into the operating system kernel. The above program includes a code and code segments, and can be easily derived by a programmer skilled in the art. Also, the invention can be embodied in a general purpose digital computer by running the above program from a computer usable medium. The medium includes magnetic storage media such as floppy disks and hard disks, and optically readable media such as CD-ROMs and DVDs. In addition, the above programs can be forwarded through carrier waves such as the Internet.

According to the present invention as described above, multimedia QoS can be efficiently supported by using an additional system call in the operating system of any computer in which an operating system for processing multimedia data is present, servers such as web servers and multimedia servers, network equipment such as a router, and computer switching equipment.

Having described the invention in detail and by reference to the drawings, it will be apparent that modification and variations are possible without departing from the scope of the invention. Therefore, it is intended that the invention not be limited by the precise structure shown and described, but rather the full scope of the invention as defined in the following claims.

What is claimed is:

1. A micro-scheduling method for implementation on an operating system kernel for supporting multimedia applications, said micro-scheduling method comprising the steps of:

(a) determining performance parameters of a plurality of applications by measuring an I/O-bound job performance and a CPU-bound job performance in said applications;

(b) adjusting said performance parameters according to a predetermined policy when executing a job admission control;

(c) determining processing priority of each of a plurality of application classes by scheduling periodical executions of I/O jobs of data that are not required to be moved to a user space due to characteristics of multimedia application data; and (d) executing a special I/O system call according to an order of the determined priority, wherein said step (a) further comprises:
  executing an availability test;
  implementing an admission control and a resource reservation;
  describing a policy to decide default resources and a maximum scope of each of said application on system resources;
  measuring CPU-bound performance;
  and measuring I/O-bound performance,
  wherein a special I/O system call is responsible for implementing periodical I/O according to resources allocated by the scheduled I/O jobs if a job in an application corresponds to a special I/O after it is determined that an I/O service class 4 corresponds to at least one of four special I/O jobs,
  wherein said special I/O jobs includes I/O service class 1 which moves data from a user space to a system, I/O service class 2 which moves data from a user space to another user space, I/O service class 3 which moves data from a system to a user space, and I/O service class 4 which moves data from a system to another system,
wherein said I/O service class 4 includes special I/O class 1 which carries out I/O between a disk file and a network, special I/O class 2 which carries out I/O between an I/O unit and a network, and special I/O class 3 which carries out I/O to and from an application, between threads, or in a loop-back method, and
wherein said special I/O class 1 executes the steps of:
(a-1) allocating a file buffer;
(b-1) reading n bytes from said buffer, wherein n is a positive integer;
(c-1) checking in a protocol data unit (PDU) whether said file buffer is empty;
(d-1) executing a fork by waking up a disk device from which data is to be read if said file buffer is empty;
(e-1) storing the result in an HQ if said file buffer is empty;
(f-1) forwarding data stored in said HQ if said file buffer is not empty, and maintaining said disk in a sleep state;
(g-1) forwarding a user data protocol (UDP) data to a network system;
(h-1) storing the received UDP data in a buffer of said network system; and
(i-1) forwarding said UDP data stored in said buffer to said network system using medium access control, wherein said special I/O system call manages the steps (a-1) through (f-1).

2. A micro-scheduling method for implementation on an operating system kernel for supporting multimedia applications said micro-scheduling method comprising the steps of:
(a) determining performance parameters of a plurality of applications by measuring an I/O-bound job performance and a CPU-bound job performance in said applications;
(b) adjusting said performance parameters according to a predetermined policy when executing a job admission control;
(c) determining processing priority of each of a plurality of application classes by scheduling periodical executions of I/O jobs of data that are not required to be moved to a user space due to characteristics of multimedia application data; and
(d) executing a special I/O system call according to an order of the determined priority,
wherein said step (a) further comprises:
executing an availability test;
implementing an admission control and a resource reservation;
describing a policy to decide default resources and a maximum scope of each of said application on system resources;
measuring CPU-bound performance;
and measuring I/O-bound performance,
wherein a special I/O system call is responsible for implementing periodical I/O according to resources allocated by the scheduled I/O jobs if a job in an application corresponds to a special I/O after it is determined that an I/O service class 4 corresponds to at least one of four special I/O jobs,
wherein said special I/O jobs includes I/O service class 1 which moves data from a user space to a system, I/O service class 2 which moves data from a user space to another user space, I/O service class 3 which moves data from a system to a user space, and I/O service class 4 which moves data from a system to another system,
wherein said I/O service class 4 includes special I/O class 1 which carries out I/O between a disk file and a network, special I/O class 2 which carries out I/O between an I/O unit and a network, and special I/O class 3 which carries out I/O to and from an application, between threads, or in a loop-back method, and
wherein said special I/O class 2 executes the steps of:
(a-2) inputting an external voice through a microphone;
(b-2) transforming the input external voice into an electrical signal;
(c-2) converting the transformed voice signal into digital voice data in a hardware vocoder;
(d-2) storing said digital voice data in a buffer;
(e-2) encapsulating said digital voice data stored in said buffer into packets;
(f-2) storing the packetized data in a high queue (HQ);
(g-2) forwarding Real-time Transport Protocol (RTP)/User Data Protocol (UDP) data to a network system;
(h-2) storing the received RTP/UDP data in a buffer of a network system; and
(i-2) forwarding said RTP/UDP data stored in said buffer to said network system using medium access control, wherein said special I/O system call manages the steps (e-2) through (g-2).

3. A micro-scheduling method for implementation on an operating system kernel for supporting multimedia applications, said micro-scheduling method comprising the steps of:
(a) determining performance parameters of a plurality of applications by measuring an I/O-bound job performance and a CPU-bound job performance in said applications;
(b) adjusting said performance parameters according to a predetermined policy when executing a job admission control;
(c) determining processing priority of each of a plurality of application classes by scheduling periodical executions of I/O jobs of data that are not required to be moved to a user space due to characteristics of multimedia application data; and
(d) executing a special I/O system call according to an order of the determined priority,
wherein the performance measuring includes the steps of:
(pm-a) identifying each application as a plurality of classes; and
(pm-b) measuring said performance parameters using test programs appropriate for said application classes, and
wherein said step (pm-b) includes the steps of:
(pm-b-1) measuring how many transactions can be processed by using a benchmark program appropriate to said characteristics of an application, and deciding a minimum and a maximum number of transactions to process in a system for a mission critical job;
(pm-b-2) measuring a number of encoding or decoding executions per second after a user describes relevant information and QoS parameters, and interactive applications for a multimedia application that requires a resource reservation and interactive applications; and
(pm-b-3) omitting measuring said performance of said applications that do not require real-time processing.

4. The method of claim 3, wherein said step (pm-b) further includes informing a user to use a system with better performance if said step (pm-b-1) determines that said system does not have enough performance.

5. An operating system kernel for supporting multimedia applications, said operating system kernel comprising:
an enterprise QoS (E-QoS) resource managing means for determining performance parameters by measuring an I/O-bound job performance and a CPU-bound job performance in said application, and executing a job admission control to adjust said performance parameters according to a predetermined policy;
a special I/O scheduling means for scheduling periodical executions of I/O jobs of data that are not required to be moved to a user space due to characteristics of multimedia application data; and
a special I/O service routine means for executing a special I/O system call according to an order of the determined priority,
wherein a special I/O system call is responsible for implementing periodical I/O according to resources allocated by the scheduled I/O jobs if a job in an application corresponds to a special I/O after it is determined that an I/O service class 4 corresponds to at least one of four special I/O jobs,
wherein said special I/O jobs includes I/O service class 1 which moves data from a user space to a system, I/O service class 2 which moves data from a user space to another user space, I/O service class 3 which moves data from a system to a user space, and I/O service class 4 which moves data from a system to another system,
wherein said I/O service class 4 includes special I/O class 1 which carries out I/O between a disk file and a network, special I/O class 2 which carries out I/O between an I/O unit and a network, and special I/O class 3 which carries out I/Os to and from an application, between threads, or in a loop-back method, and
wherein said special I/O class 1 executes the steps of:
(a-1) allocating a file buffer;
(b-1) reading n bytes from said file buffer, wherein n is a positive integer;
(c-1) checking in a protocol data unit (PDU) whether said file buffer is empty;
(d-1) executing a fork by waking up a disk device from which data is to be read if said file buffer is empty;
(e-1) storing the result in an HQ if said file buffer is empty;
(f-1) forwarding data stored in said HQ if said file buffer is not empty, and maintaining said disk in a sleep state;
(g-1) forwarding a user data protocol (UDP) data to a network system;
(h-1) storing the received UDP data in a buffer of said network system; and
(i-1) forwarding said UDP data stored in said buffer to said network system using medium access control, wherein said special I/O system call manages the steps (a-1) through (f-1).

6. An operating system kernel for supporting multimedia applications, said operating system kernel comprising:
an enterprise QoS (E-QoS) resource managing means for determining performance parameters by measuring an I/O-bound job performance and a CPU-bound job performance in said application, and executing a job admission control to adjust said performance parameters according to a predetermined policy;
a special I/O scheduling means for scheduling periodical executions of I/O jobs of data that are not required to be moved to a user space due to characteristics of multimedia application data; and
a special I/O service routine means for executing a special I/O system call according to an order of the determined priority,
wherein a special I/O system call is responsible for implementing periodical I/O according to resources allocated by the scheduled I/O jobs if a job in an application corresponds to a special I/O after it is determined that an I/O service class 4 corresponds to at least one of four special I/O jobs,
wherein said special I/O jobs includes I/O service class 1 which moves data from a user space to a system, I/O service class 2 which moves data from a user space to another user space, I/O service class 3 which moves data from a system to a user space and I/O service class 4 which moves data from a system to another system,
wherein said I/O service class 4 includes special I/O class 1 which carries out I/O between a disk file and a network, special I/O class 2 which carries out I/O between an I/O unit and a network, and special I/O class 3 which carries out I/Os to and from an application, between threads, or in a loop-back method,
wherein said special I/O class 2 executes the steps comprising:
(a-2) inputting an external voice through a microphone;
(b-2) transforming the input external voice into an electrical signal;
(c-2) converting the transformed voice signal into digital voice data in a hardware vocoder;
(d-2) storing said digital voice data in a buffer;
(e-2) encapsulating said digital voice data stored in said buffer into packets;
(f-2) storing the packetized data in a high queue (HQ);
(g-2) forwarding Real-time Transport Protocol (RTP)/User Data Protocol (UDP) data to a network system;
(h-2) storing the received RTP/UDP data in a buffer of a network system;
(i-2) forwarding said RTP/UDP data stored in said buffer to said network system using medium access control, wherein said special I/O system call manages the steps (e-2) through (g-2).

7. An operating system kernel for supporting multimedia applications, said operating system kernel comprising:
an enterprise QoS (E-QoS) resource managing means for determining performance parameters by measuring an I/O-bound job performance and a CPU-bound job performance in said application, and executing a job admission control to adjust said performance parameters according to a predetermined policy;
a special I/O scheduling means for scheduling periodical executions of I/O jobs of data that are not required to be moved to a user space due to characteristics of multimedia application data; and
a special I/O service routine means for executing a special I/O system call according to an order of the determined priority, wherein the performance measuring includes the steps:
(pm-a) identifying each application as a plurality of classes; and
(pm-b) measuring said performance parameters using test programs appropriate for said application classes, and
wherein said step (pm-b) includes the steps comprising:
(pm-b-1) measuring how many transactions can be processed by using a benchmark program appropriate to said characteristics of an application, and deciding a minimum and a maximum number of transactions to process in a system for a mission critical job;
(pm-b-2) measuring a number of encoding or decoding executions per second after a user describes relevant information and QoS parameters for a multimedia application that requires a resource reservation and interactive applications, and
(pm-b-3) omitting measuring said performance of said applications that do not require real-time processing.

8. The operating system kernel of claim 7, wherein said step (pm-b) further includes informing a user to use a system with better performance if said step (pm-b-1) determines that said system does not have enough performance.

9. A micro-scheduling method for implementation on an operating system kernel for supporting multimedia applications, said micro-scheduling method comprising the steps of:
(a) determining performance parameters of a plurality of applications by measuring an I/O-bound job performance and a CPU-bound job performance in said applications;
(b) adjusting said performance parameters according to a predetermined policy when executing a job admission control;
(c) determining processing priority of each of a plurality of application classes by scheduling periodical executions of I/O jobs of data that are not required to be moved to a user space due to characteristics of multimedia application data; and
(d) executing a special I/O system call according to an order of the determined priority,
wherein said step (b) is implemented by enterprise quality of service (E-QoS) modeling based on the determined performance parameters, said processing priority of said application class, and a predetermined resource allocation in a policy description table,
wherein a special I/O system call is responsible for implementing periodical I/O according to resources allocated by the scheduled I/O jobs if a job in an application corresponds to a special I/O after it is determined that an I/O service class 4 corresponds to at least one of four special I/O jobs,
wherein said special I/O jobs includes I/O service class 1 which moves data from a user space to a system, I/O service class 2 which moves data from a user space to another user space, I/O service class 3 which moves data from a system to a user space, and I/O service class 4 which moves data from a system to another system,
wherein said I/O service class 4 includes special I/O class 1 which carries out I/O between a disk file and a network, special I/O class 2 which carries out I/O between an I/O unit and a network, and special I/O class 3 which carries out I/O to and from an application, between threads, or in a loop-back method, and wherein said special I/O class 1 executes the steps of:
(a-1) allocating a file buffer;
(b-1) reading n bytes from said buffer, wherein n is a positive integer;
(c-1) checking in a protocol data unit (PDU) whether said file buffer is empty;
(d-1) executing a fork by waking up a disk device from which data is to be read if said file buffer is empty;
(e-1) storing the result in an HQ if said file buffer is empty;
(f-1) forwarding data stored in said HQ if said file buffer is not empty, and maintaining said disk in a sleep state;
(g-1) forwarding a user data protocol (UDP) data to a network system;
(h-1) storing the received UDP data in a buffer of said network system; and
(i-1) forwarding said UDP data stored in said buffer to said network system using medium access control, wherein said special I/O system call manages the steps (a-1) through (f-1).

10. A micro-scheduling method for implementation on an operating system kernel for supporting multimedia applications, said micro-scheduling method comprising the steps of:
(a) determining performance parameters of a plurality of applications by measuring an I/O-bound job performance and a CPU-bound job performance in said applications;
(b) adjusting said performance parameters according to a predetermined policy when executing a job admission control;
(c) determining processing priority of each of a plurality of application classes by scheduling periodical executions of I/O jobs of data that are not required to be moved to a user space due to characteristics of multimedia application data; and
(d) executing a special I/O system call according to an order of the determined priority,
wherein in said step (a), said performance parameters are determined by measuring said I/O-bound job performance and said CPU-bound job performance required for said application with a test program appropriate for the class of application for which the determination is being made,
wherein a special I/O system call is responsible for implementing periodical I/O according to resources allocated by the scheduled I/O jobs if a job in an application corresponds to a special I/O after it is determined that an I/O service class 4 corresponds to at least one of four special I/O jobs,
wherein said special I/O jobs includes I/O service class 1 which moves data from a user space to a system, I/O service class 2 which moves data from a user space to another user space, I/O service class 3 which moves data from a system to a user space, and I/O service class 4 which moves data from a system to another system,
wherein said I/O service class 4 includes special I/O class 1 which carries out I/O between a disk file and a network, special I/O class 2 which carries out I/O between an I/O unit and a network, and special I/O class 3 which carries out I/O to and from an application, between threads, or in a loop-back method, and
wherein said special I/O class 1 executes the steps of:
(a-1) allocating a file buffer;
(b-1) reading n bytes from said buffer, wherein n is a positive integer;

(c-1) checking in a protocol data unit (PDU) whether said file buffer is empty;
(d-1) executing a fork by waking up a disk device from which data is to be read if said file buffer is empty;
(e-1) storing the result in an HQ if said file buffer is empty;
(f-1) forwarding data stored in said HQ if said file buffer is not empty, and maintaining said disk in a sleep state;
(g-1) forwarding a user data protocol (UDP) data to a network system;
(h-1) storing the received UDP data in a buffer of said network system; and
(i-1) forwarding said UDP data stored in said buffer to said network system using medium access control, wherein said special I/O system call manages the steps (a-1) through (f-1).

11. A micro-scheduling method for implementation on an operating system kernel for supporting multimedia applications, said micro-scheduling method comprising the steps of:
(a) determining performance parameters of a plurality of applications by measuring an I/O-bound job performance and a CPU-bound job performance in said applications;
(b) adjusting said performance parameters according to a predetermined policy when executing a job admission control;
(c) determining processing priority of each of a plurality of application classes by scheduling periodical executions of I/O jobs of data that are not required to be moved to a user space due to characteristics of multimedia application data; and
(d) executing a special I/O system call according to an order of the determined priority,
wherein a special I/O system call is responsible for implementing periodical I/O according to resources allocated by the scheduled 1O jobs if a job in an application corresponds to a special I/O after it is determined that an I/O service class 4 corresponds to at least one of four special I/O jobs,
wherein said special I/O jobs includes I/O service class 1 which moves data from a user space to a system, I/O service class 2 which moves data from a user space to another user space, I/O service class 3 which moves data from a system to a user space, and I/O service class 4 which moves data from a system to another system,
wherein said I/O service class 4 includes special I/O class 1 which carries out I/O between a disk file and a network, special I/O class 2 which carries out I/O between an I/O unit and a network, and special I/O class 3 which carries out I/O to and from an application, between threads, or in a loop-back method, and
wherein said special I/O class 1 executes the steps of:
(a-1) allocating a file buffer;
(b-1) reading n bytes from said buffer, wherein n is a positive integer;
(c-1) checking in a protocol data unit (PDU) whether said file buffer is empty;
(d-1) executing a fork by waking up a disk device from which data is to be read if said file buffer is empty;
(e-1) storing the result in an HQ if said file buffer is empty;
(f-1) forwarding data stored in said HQ if said file buffer is not empty, and maintaining said disk in a sleep state;
(g-1) forwarding a user data protocol (UDP) data to a network system;
(h-1) storing the received UDP data in a buffer of said network system; and
(i-1) forwarding said UDP data stored in said buffer to said network system using medium access control, wherein said special I/O system call manages the steps (a-1) through (f-1).

12. A micro-scheduling method for implementation on an operating system kernel for supporting multimedia applications, said micro-scheduling method comprising the steps of:
(a) determining performance parameters of a plurality of applications by measuring an I/O-bound job performance and a CPU-bound job performance in said applications;
(b) adjusting said performance parameters according to a predetermined policy when executing a job admission control;
(c) determining processing priority of each of a plurality of application classes by scheduling periodical executions of I/O jobs of data that are not required to be moved to a user space due to characteristics of multimedia application data; and
(d) executing a special I/O system call according to an order of the determined priority,
wherein said step (b) is implemented by enterprise quality of service (E-QoS) modeling based on the determined performance parameters, said processing priority of said application class, and a predetermined resource allocation in a policy description table,
wherein a special I/O system call is responsible for implementing periodical I/O according to resources allocated by the scheduled I/O jobs if a job in an application corresponds to a special I/O after it is determined that an I/O service class 4 corresponds to at least one of four special I/O jobs,
wherein said special I/O jobs includes I/O service class 1 which moves data from a user space to a system, I/O service class 2 which moves data from a user space to another user space, I/O service class 3 which moves data from a system to a user space, and I/O service class 4 which moves data from a system to another system,
wherein said I/O service class 4 includes special I/O class 1 which carries out I/O between a disk file and a network, special I/O class 2 which carries out I/O between an I/O unit and a network, and special I/O class 3 which carries out I/O to and from an application, between threads, or in a loop-back method, and
wherein said special I/O class 2 executes the steps of:
(a-2) inputting an external voice through a microphone;
(b-2) transforming the input external voice into an electrical signal;
(c-2) converting the transformed voice signal into digital voice data in a hardware vocoder;
(d-2) storing said digital voice data in a buffer;
(e-2) encapsulating said digital voice data stored in said buffer into packets;
(f-2) storing the packetized data in a high queue (HQ);
(g-2) forwarding Real-time Transport Protocol (RTP)/User Data Protocol (UDP) data to a network system;
(h-2) storing the received RTP/UDP data in a buffer of a network system; and
(i-2) forwarding said RTP/UDP data stored in said buffer to said network system using medium access control, wherein said special I/O system call manages the steps (e-2) through (g-2).

13. A micro-scheduling method for implementation on an operating system kernel for supporting multimedia applications, said micro-scheduling method comprising the steps of:
  (a) determining performance parameters of a plurality of applications by measuring an I/O-bound job performance and a CPU-bound job performance in said applications;
  (b) adjusting said performance parameters according to a predetermined policy when executing a job admission control;
  (c) determining processing priority of each of a plurality of application classes by scheduling periodical executions of I/O jobs of data that are not required to be moved to a user space due to characteristics of multimedia application data; and
  (d) executing a special I/O system call according to an order of the determined priority,
  wherein in said step (a), said performance parameters are determined by measuring said I/O-bound job performance and said CPU-bound job performance required for said application with a test program appropriate for the class of application for which the determination is being made,
  wherein a special I/O system call is responsible for implementing periodical I/O according to resources allocated by the scheduled I/O jobs if a job in an application corresponds to a special I/O after it is determined that an I/O service class 4 corresponds to at least one of four special I/O jobs,
  wherein said special I/O jobs includes I/O service class 1 which moves data from a user space to a system, I/O service class 2 which moves data from a user space to another user space, I/O service class 3 which moves data from a system to a user space, and I/O service class 4 which moves data from a system to another system,
  wherein said I/O service class 4 includes special I/O class 1 which carries out I/O between a disk file and a network, special I/O class 2 which carries out I/O between an I/O unit and a network, and special I/O class 3 which carries out I/O to and from an application, between threads, or in a loop-back method, and
  wherein said special I/O class 2 executes the steps of:
    (a-2) inputting an external voice through a microphone;
    (b-2) transforming the input external voice into an electrical signal;
    (c-2) converting the transformed voice signal into digital voice data in a hardware vocoder;
    (d-2) storing said digital voice data in a buffer;
    (e-2) encapsulating said digital voice data stored in said buffer into packets;
    (f-2) storing the packetized data in a high queue (HQ);
    (g-2) forwarding Real-time Transport Protocol (RTP) User Data Protocol (UDP) data to a network system;
    (h-2) storing the received RTP/UDP data in a buffer of a network system; and
    (i-2) forwarding said RTP/UDP data stored in said buffer to said network system using medium access control, wherein said special I/O system call manages the steps (e-2) through (g-2).

14. A micro-scheduling method for implementation on an operating system kernel for supporting multimedia applications, said micro-scheduling method comprising the steps of:
  (a) determining performance parameters of a plurality of applications by measuring an I/O-bound job performance and a CPU-bound job performance in said applications;
  (b) adjusting said performance parameters according to a predetermined policy when executing a job admission control;
  (c) determining processing priority of each of a plurality of application classes by scheduling periodical executions of I/O jobs of data that are not required to be moved to a user space due to characteristics of multimedia application data; and
  (d) executing a special I/O system call according to an order of the determined priority,
  wherein a special I/O system call is responsible for implementing periodical I/O according to resources allocated by the scheduled I/O jobs if a job in an application corresponds to a special I/O after it is determined that an I/O service class 4 corresponds to at least one of four special I/O jobs,
  wherein said special I/O jobs includes I/O service class 1 which moves data from a user space to a system, I/O service class 2 which moves data from a user space to another user space, I/O service class 3 which moves data from a system to a user space, and I/O service class 4 which moves data from a system to another system,
  wherein said I/O service class 4 includes special I/O class 1 which carries out I/O between a disk file and a network, special I/O class 2 which carries out I/O between an I/O unit and a network, and special I/O class 3 which carries out I/O to and from an application, between threads, or in a loop-back method, and
  wherein said special I/O class 2 executes the steps of:
    (a-2) inputting an external voice through a microphone;
    (b-2) transforming the input external voice into an electrical signal;
    (c-2) converting the transformed voice signal into digital voice data in a hardware vocoder;
    (d-2) storing said digital voice data in a buffer;
    (e-2) encapsulating said digital voice data stored in said buffer into packets;
    (f-2) storing the packetized data in a high queue (HQ);
    (g-2) forwarding Real-time Transport Protocol (RTP)/ User Data Protocol (UDP) data to a network system;
    (h-2) storing the received RTP/UDP data in a buffer of a network system; and
    (i-2) forwarding said RTP/UDP data stored in said buffer to said network system using medium access control, wherein said special I/O system call manages the steps (e-2) through (g-2).

15. An operating system kernel for supporting multimedia applications, said operating system kernel comprising:
  an enterprise QoS (E-QoS) resource managing means for determining performance parameters by measuring an I/O-bound job performance and a CPU-bound job performance in said application, and executing a job admission control to adjust said performance parameters according to a predetermined policy;
  a special I/O scheduling means for scheduling periodical executions of I/O jobs of data that are not required to be moved to a user space due to characteristics of multimedia application data; and
  a special I/O service routine means for executing a special I/O system call according to an order of the determined priority,
  wherein said E-QOS resource managing means manages resources by E-QoS modeling based on the measured performance parameters of an application, said order of priority according to an application class, and resource allocation in a predetermined policy description table, wherein a special I/O system call is responsible for implementing periodical I/O according to resources allocated by the scheduled I/O jobs if a job in an application corresponds to a special I/O after it is determined that an I/O service class 4 corresponds to at least one of four special I/O jobs, wherein said special I/O jobs includes I/O service class 1 which moves data from a user space to a system, I/O service class 2 which moves data from a user space to another user space, I/O service class 3 which moves data from a system to a user space, and I/O service class 4 which moves data from a system to another system, wherein said I/O service class 4 includes special I/O class 1 which carries out I/O between a disk file and a network, special I/O class 2 which carries out I/O between an I/O unit and a network, and special I/O class 3 which carries out I/Os to and from an application, between threads, or in a loop-back method, and wherein said special I/O class 1 executes the steps of:
 (a-1) allocating a file buffer;
 (b-1) reading n bytes from said file buffer, wherein n is a positive integer;
 (c-1) checking in a protocol data unit (PDU) whether said file buffer is empty;
 (d-1) executing a fork by waking up a disk device from which data is to be read if said file buffer is empty;
 (e-1) storing the result in an HQ if said file buffer is empty;
 (f-1) forwarding data stored in said HQ if said file buffer is not empty, and maintaining said disk in a sleep state;
 (g-1) forwarding a user data protocol (UDP) data to a network system;
 (h-1) storing the received UDP data in a buffer of said network system; and
 (i-1) forwarding said UDP data stored in said buffer to said network system using medium access control, wherein said special I/O system call manages the steps (a-1) through (f-1).

16. An operating system kernel for supporting multimedia applications, said operating system kernel comprising:
 an enterprise QoS (E-QoS) resource managing means for determining performance parameters by measuring an I/O-bound job performance and a CPU-bound job performance in said application, and executing a job admission control to adjust said performance parameters according to a predetermined policy;
 a special I/O scheduling means for scheduling periodical executions of I/O jobs of data that are not required to be moved to a user space due to characteristics of multimedia application data; and
 a special I/O service routine means for executing a special I/O system call according to an order of the determined priority,
 wherein the performance measuring uses a test program appropriate for said application class,
 wherein a special I/O system call is responsible for implementing periodical I/O according to resources allocated by the scheduled I/O jobs if a job in an application corresponds to a special I/O after it is determined that an I/O service class 4 corresponds to at least one of four special I/O jobs,
 wherein said special I/O jobs includes I/O service class 1 which moves data from a user space to a system, I/O service class 2 which moves data from a user space to another user space, I/O service class 3 which moves data from a system to a user space, and I/O service class 4 which moves data from a system to another system,
 wherein said I/O service class 4 includes special I/O class 1 which carries out I/O between a disk file and a network, special I/O class 2 which carries out I/O between an I/O unit and a network, and special I/O class 3 which carries out I/Os to and from an application, between threads, or in a loop-back method,
 wherein said special I/O class 1 executes the steps of:
  (a-1) allocating a file buffer;
  (b-1) reading n bytes from said file buffer, wherein n is a positive integer;
  (c-1) checking in a protocol data unit (PDU) whether said file buffer is empty;
  (d-1) executing a fork by waking up a disk device from which data is to be read if said file buffer is empty;
  (e-1) storing the result in an HQ if said file buffer is empty;
  (f-1) forwarding data stored in said HQ if said file buffer is not empty, and maintaining said disk in a sleep state;
  (g-1) forwarding a user data protocol (UDP) data to a network system;
  (h-1) storing the received UDP data in a buffer of said network system; and
  (i-1) forwarding said UDP data stored in said buffer to said network system using medium access control, wherein said special I/O system call manages the steps (a-1) through (f-1).

17. An operating system kernel for supporting multimedia applications, said operating system kernel comprising:
 an enterprise QoS (E-QoS) resource managing means for determining performance parameters by measuring an I/O-bound job performance and a CPU-bound job performance in said application, and executing a job admission control to adjust said performance parameters according to a predetermined policy;
 a special I/O scheduling means for scheduling periodical executions of I/O jobs of data that are not required to be moved to a user space due to characteristics of multimedia application data; and
 a special I/O service routine means for executing a special I/O system call according to an order of the determined priority,
 an availability test means for executing an availability test;
 an admission control and resource reservation means for executing admission control and resource reservation;
 a CPU-bound performance measuring means for measuring CPU-bound performance; and
 an I/O-bound performance measuring means for measuring I/O-bound performance,
 wherein a special I/O system call is responsible for implementing periodical I/O according to resources allocated by the scheduled I/O jobs if a job in an application corresponds to a special I/O after it is determined that an I/O service class 4 corresponds to at least one of four special I/O jobs,
 wherein said special I/O jobs includes I/O service class 1 which moves data from a user space to a system, I/O service class 2 which moves data from a user space to another user space, I/O service class 3 which moves data from a system to a user space, and I/O service class 4 which moves data from a system to another system, wherein said I/O service class 4 includes special I/O class 1 which carries out I/O between a disk file and a network, special I/O class 2 which carries out I/O between an I/O unit and a network, and special I/O class 3 which carries out I/Os to and from an application, between threads, or in a loop-back method, and wherein said special I/O class 1 executes the steps of:
(a-1) allocating a file buffer;
(b-1) reading n bytes from said file buffer, wherein n is a positive integer;
(c-1) checking in a protocol data unit (PDU) whether said file buffer is empty;
(d-1) executing a fork by waking up a disk device from which data is to be read if said file buffer is empty;
(e-1) storing the result in an HQ if said file buffer is empty;
(f-1) forwarding data stored in said HQ if said file buffer is not empty, and maintaining said disk in a sleep state;
(g-1) forwarding a user data protocol (UDP) data to a network system;
(h-1) storing the received UDP data in a buffer of said network system; and
(i-1) forwarding said UDP data stored in said buffer to said network system using medium access control, wherein said special I/O system call manages the steps (a-1) through (f-1).

18. An operating system kernel for supporting multimedia applications, said operating system kernel comprising:
an enterprise QoS (E-QoS) resource managing means for determining performance parameters by measuring an I/O-bound job performance and a CPU-bound job performance in said application, and executing a job admission control to adjust said performance parameters according to a predetermined policy;
a special I/O scheduling means for scheduling periodical executions of I/O jobs of data that are not required to be moved to a user space due to characteristics of multimedia application data; and
a special I/O service routine means for executing a special I/O system call according to an order of the determined priority,
wherein said E-QoS resource managing means manages resources by E-QoS modeling based on the measured performance parameters of an application, said order of priority according to an application class, and resource allocation in a predetermined policy description table,
wherein a special I/O system call is responsible for implementing periodical I/O according to resources allocated by the scheduled I/O jobs if a job in an application corresponds to a special I/O after it is determined that an I/O service class 4 corresponds to at least one of four special I/O jobs,
wherein said special I/O jobs includes I/O service class 1 which moves data from a user space to a system, I/O service class 2 which moves data from a user space to another user space, I/O service class 3 which moves data from a system to a user space, and I/O service class 4 which moves data from a system to another system,
wherein said I/O service class 4 includes special I/O class 1 which carries out I/O between a disk file and a network, special I/O class 2 which carries out I/O between an I/O unit and a network, and special I/O class 3 which carries out I/Os to and from an application, between threads, or in a loop-back method, and wherein said special I/O class 2 executes the steps comprising:
(a-2) inputting an external voice through a microphone;
(b-2) transforming the input external voice into an electrical signal;
(c-2) converting the transformed voice signal into digital voice data in a hardware vocoder;
(d-2) storing said digital voice data in a buffer;
(e-2) encapsulating said digital voice data stored in said buffer into packets;
(f-2) storing the packetized data in a high queue (HQ);
(g-2) forwarding Real-time Transport Protocol (RTP)/User Data Protocol (UDP) data to a network system;
(h-2) storing the received RTP/UDP data in a buffer of a network system;
(i-2) forwarding said RTP/UDP data stored in said buffer to said network system using medium access control, wherein said special I/O system call manages the steps (e-2) through (g-2).

19. An operating system kernel for supporting multimedia applications, said operating system kernel comprising:
an enterprise QoS (E-QoS) resource managing means for determining performance parameters by measuring an I/O-bound job performance and a CPU-bound job performance in said application, and executing a job admission control to adjust said performance parameters according to a predetermined policy;
a special I/O scheduling means for scheduling periodical executions of I/O jobs of data that are not required to be moved to a user space due to characteristics of multimedia application data; and
a special I/O service routine means for executing a special I/O system call according to an order of the determined priority,
wherein the performance measuring uses a test program appropriate for said application class,
wherein a special I/O system call is responsible for implementing periodical I/O according to resources allocated by the scheduled I/O jobs if a job in an application corresponds to a special I/O after it is determined that an I/O service class 4 corresponds to at least one of four special I/O jobs,
wherein said special I/O jobs includes I/O service class 1 which moves data from a user space to a system, I/O service class 2 which moves data from a user space to another user space, I/O service class 3 which moves data from a system to a user space, and I/O service class 4 which moves data from a system to another system,
wherein said I/O service class 4 includes special I/O class 1 which carries out I/O between a disk file and a network, special I/O class 2 which carries out I/O between an I/O unit and a network, and special I/O class 3 which carries out I/Os to and from an application, between threads, or in a loop-back method,
wherein said special I/O class 2 executes the steps comprising:
(a-2) inputting an external voice through a microphone;
(b-2) transforming the input external voice into an electrical signal;
(c-2) converting the transformed voice signal into digital voice data in a hardware vocoder;
(d-2) storing said digital voice data in a buffer;
(e-2) encapsulating said digital voice data stored in said buffer into packets;
(f-2) storing the packetized data in a high queue (HQ);
(g-2) forwarding Real-time Transport Protocol (RTP) User Data Protocol (UDP) data to a network system;

(h-2) storing the received RTP/UDP data in a buffer of a network system;

(i-2) forwarding said RTP/UDP data stored in said buffer to said network system using medium access control, wherein said special I/O system call manages the steps (e-2) through (g-2).

20. An operating system kernel for supporting multimedia applications, said operating system kernel comprising:

an enterprise QoS (E-QoS) resource managing means for determining performance parameters by measuring an I/O-bound job performance and a CPU-bound job performance in said application, and executing a job admission control to adjust said performance parameters according to a predetermined policy;

a special I/O scheduling means for scheduling periodical executions of I/O jobs of data that are not required to be moved to a user space due to characteristics of multimedia application data; and a special I/O service routine means for executing a special I/O system call according to an order of the determined priority, an availability test means for executing an availability test;

an admission control and resource reservation means for executing admission control and resource reservation;

a CPU-bound performance measuring means for measuring CPU-bound performance; and an I/O-bound performance measuring means for measuring I/O-bound performance, wherein a special I/O system call is responsible for implementing periodical I/O according to resources allocated by the scheduled I/O jobs if a job in an application corresponds to a special I/O after it is determined that an I/O service class 4 corresponds to at least one of four special I/O jobs, wherein said special I/O jobs includes I/O service class 1 which moves data from a user space to a system, I/O service class 2 which moves data from a user space to another user space, I/O service class 3 which moves data from a system to a user space, and I/O service class 4 which moves data from a system to another system, wherein said I/O service class 4 includes special I/O class 1 which carries out I/O between a disk file and a network, special I/O class 2 which carries out I/O between an I/O unit and a network, and special I/O class 3 which carries out I/Os to and from an application, between threads, or in a loop-back method, and wherein said special I/O class 2 executes the steps comprising:

(a-2) inputting an external voice through a microphone;

(b-2) transforming the input external voice into an electrical signal;

(c-2) converting the transformed voice signal into digital voice data in a hardware vocoder;

(d-2) storing said digital voice data in a buffer;

(e-2) encapsulating said digital voice data stored in said buffer into packets;

(f-2) storing the packetized data in a high queue (HQ);

(g-2) forwarding Real-time Transport Protocol (RTP)/ User Data Protocol (UDP) data to a network system;

(h-2) storing the received RTP/UDP data in a buffer of a network system;

(i-2) forwarding said RTP/UDP data stored in said buffer to said network system using medium access control, wherein said special I/O system call manages the steps (e-2) through (g-2).

* * * * *